United States Patent [19]

Achorn et al.

[11] Patent Number: 4,531,962
[45] Date of Patent: Jul. 30, 1985

[54] PRODUCTION OF ACID-TYPE FERTILIZER SOLUTIONS

[75] Inventors: Frank P. Achorn; Carl A. Cole, Jr., both of Killen, Ala.

[73] Assignee: Tennessee Valley Authority, Muscle Shoals, Ala.

[21] Appl. No.: 616,879

[22] Filed: Jun. 4, 1984

Related U.S. Application Data

[63] Continuation of Ser. No. 588,833, Mar. 12, 1984, now Defensive Publication No. T104,701.

[51] Int. Cl.$^3$ .............................................. C05C 9/00
[52] U.S. Cl. ........................................ 71/29; 71/30; 71/64.1
[58] Field of Search ............... 71/29, 30, 34, 36, 41, 71/43, 64.08, 64.1; 423/306

[56] References Cited

U.S. PATENT DOCUMENTS

| | | | |
|---|---|---|---|
| 4,308,048 | 12/1981 | Sheridan et al. | 71/29 X |
| 4,315,763 | 2/1982 | Staller et al. | 71/29 |
| 4,318,729 | 3/1982 | Coury | 71/29 |

Primary Examiner—Ferris H. Lander
Attorney, Agent, or Firm—Robert A. Petrusek

[57] ABSTRACT

In the first embodiment of our invention, solution type fertilizers are produced by reacting phosphoric acid with urea-ammonium nitrate solution (35 percent CO{NH$_2$}$_2$, 45 percent NH$_4$NO$_3$, and 20 percent H$_2$O), and urea. In the second embodiment of our invention, the same solution is produced by reacting phosphoric acid with a urea-ammonium nitrate suspension that contains 36 percent nitrogen, 56 percent urea, and 29 percent ammonium nitrate. The ammonium nitrate portion of the nitrogen solution in said first embodiment reacts with the urea and phosphoric acid to produce urea nitrate (CO{NH}$_2$.HNO$_3$) and ammonium phosphate (probably NH$_4$H$_2$PO$_4$). This solution contains rapidly available nitrate nitrogen as well as ammonium type nitrogen that is more slowly available than nitrate nitrogen. Similar results were obtained in said second embodiment when nitrogen solution and urea were reacted with sulfuric acid. The resulting solution contained CO(NH$_2$)$_2$.HNO$_3$ (urea nitrate) and NH$_4$HSO$_3$ (ammonium bisulfate). The products have a pH that is as low as 1.0 and as high as 4.5. It has been determined that in some soils these low pH materials may have some agronomic advantages as compared to other forms of NP fertilizers with higher pH (4.0 to 8.0). Germination studies show that when wheat seed is mixed with a 27-9-0 grade that is produced by said first embodiment of the instant invention, germination of seed is not adversely affected. This is a principal advantage of the present invention since it has been demonstrated to be a highly desirable procedure to ensure and promote early plant growth. On the other hand, tests show that when urea alone and ammonium phosphate (DAP), with a pH of ≅7, alone, and combinations of these two materials are mixed with the seed, severe germination damage occurs.

9 Claims, 2 Drawing Figures

MIX EQUIPMENT FOR UREA NITRATE
AMMONIUM PHOSPHATE AND UREA
NITRATE AMMONIUM SULFATE SOLUTIONS PROCESS

MIX EQUIPMENT FOR UREA NITRATE
AMMONIUM PHOSPHATE AND UREA
NITRATE AMMONIUM SULFATE SOLUTIONS PROCESS

SALT OUT TEMPERATURES FOR 27-9-0 GRADE FROM UREA, UREA AMMONIUM NITRATE SOLUTION, AND WET-PROCESS PHOSPHORIC ACID

PRODUCTION OF ACID-TYPE FERTILIZER SOLUTIONS

The invention herein described may be manufactured and used by or for the Government for governmental purposes without the payment to us of any royalty therefor.

This application is a continuation of application Ser. No. 588,833, filed Mar. 12, 1984, for PRODUCTION OF ACID-TYPE FERTILIZER SOLUTIONS now U.S. Def. Publ. No. T 104701, Oct. 10, 1984.

BACKGROUND OF THE INVENTION

1. Field of the Invention

The present invention relates to the production of nitrogen solution type fertilizer, which fertilizer solutions are produced by the reaction of phosphoric acid with commercially available nitrogen solutions such as those containing 35 percent urea, 45 percent ammonium nitrate, and 20 percent water. In another embodiment of the present invention, there is taught a method for the production of solutions which contain urea nitrate and ammonium bisulfate by the admixing of sulfuric acid and urea with urea ammonium nitrate solutions. In the first instance of the production of nitrate nitrogen solutions, the typical grade produced thereby is a 27-9-0, whereas, in the second instance and embodiment of the instant invention of production of urea nitrate and ammonium bisulfate solutions, the typical grade produced thereby is 25-0-0-4S.

2. Description of the Prior Art

The production of urea phosphate has been known for over 60 years. Clarkson et al., in U.S. Pat. No. 1,440,056, teach a process for the production of urea phosphate. In their process, urea was reacted with phosphoric acid producing a urea phosphate compound. Other researchers in Germany and Great Britain also produced crystalline urea phosphate. This work was covered under German Pat. No. 2,100,413 and British Pat. No. 1,191,635, respectively. Following is a summary of some of the other researchers who worked with the reaction of urea and phosphoric acid.

- A. Gittenait, M., Ger. Offen No. 2,100,413. "Process for the Production of Reaction Products from Phosphoric Acid, Urea and Ammonia and Their Use as Fertilizers," July 15, 1971;
- B. Gittenait, M., "Process for Obtaining New Reaction Products of Phosphoric Acid, Urea and Ammonia, and Their Application in the Fertilizer Industry," Paper No. ITE/71/9. Intended for presentation at FAI-ISMA Seminar on Recent Advances in Fertilizer Technology, New Delhi, India, Dec. 6-10, 1971. Gittenait, Marcel, U.S. Pat. No. 3,713,802, Jan. 30, 1973.
- C. Keens, D. Ger. Offen. No. 1,912,125, "Urea Phosphate," Oct. 9, 1969; British Appl. Mar. 11, 1968.
- D. Koebner, A., Edwards, R. H., and William, T. A., British Pat. No. 1,191,635. "Improvements in Manufacture of Orthophosphates," May 13, 1970.
- E. Nayar, K. V., and Gopinath, R. "Manufacture of High-Analysis Complex Fertilizers Through Urea-Phoaphate Route from Wet-Process Acid." Presented at ISMA Technical Conference in Sandefjord, Norway, Sept. 8-11, 1970.
- F. Beremzhanov, B. A., and Nurakhmetov, N. N. "Isotherms of Solubility of the System $(CO(NH_2)_2$—$H_3PO_4$—$H_2O$ at 0° C. and 10° C." *Izv. Akad, Nauk Kaz. SSR, Ser. Khim* 18 (2), 43-7 (1968).
- G. Kaganskii, I. M. Mukhlya, G. S., Kharlamova, V. M., and Naumov, V. A. "Solubility in the Urea-Phosphate Acid-Water System." *Zh. Prikl. Khim.* 37 (5), 1111-16 (1964).

Researchers, in more recent times, have also produced solutions from urea and sulfuric acid. See, for example, U.S. Pat. No. 4,116,664, Jones, Sept. 25, 1978, wherein is reacted urea with sulfuric acid to produce solution type fertilizers which have various grades and have a pH of less than 4. These products do not contain nitrate nitrogen. All of the nitrogen is supplied as urea nitrogen which, when applied to the soil, decomposes into ammonium nitrogen. Although the crop does absorb some ammonium nitrogen, it usually absorbs most of its nitrogen as nitrate nitrogen. However, microorganisms will decompose the ammonium nitrogen and convert it to nitrate nitrogen. This reaction requires some time to occur in the soil. The conversion is dependent upon the soil temperature and the quantity of microorganisms. It can occur within several weeks or it may take as long as several months in cool soils. Therefore, there are some advantages to having some nitrate nitrogen available for early response.

A still more recent development is taught in U.S. Pat. No. 4,315,763, Stoller, Feb. 16, 1982, wherein urea is reacted with phosphoric acid or combinations of phosphoric acid and sulfuric acid to produce solution type fertilizers; however, the product therefrom, as is the case in the product of Jones, supra, does not contain the highly desirable form of nitrate nitrogen.

It has been hypothesized that both Jones and Stoller, supra, avoided the use of phosphoric acid with other readily available fertilizer compounds such as urea-ammonium nitrate solution because of the low solubility of the nitrate compounds and the resulting ammonium phosphate solution. This difficulty was observed in our own earlier tests wherein urea-ammonium nitrate solution (45 percent ammonium nitrate, 35 percent urea, and 20 percent water) was reacted with phosphoric acid and a solid gel type substance formed in the fluid which made it impractical for handling and application. However, we discovered that when urea was added along with the conventional urea-ammonium nitrate solution, the result, quite unexpectedly, is a true solution containing highly desirable quick-acting nitrate nitrogen and the slower reacting urea nitrogen.

The production of urea nitrate per se is well known in the art. Urea nitrate $(CO\{NH_2\}_2.NHO_3)$ is an additive compound of urea, a very weak base, with $HNO_3$, a very strong acid. It has a low solubility in nitric acid and a high solubility in water. In the middle 1920s, Lipman and Mehean found it to be an excellent source of nitrogen. Urea nitrate has been made in commercial quantities by BadischeAnilin and Soda Fabrik of Ludwigshafen, Germany. This is a crystalline product and does not contain highly soluble and highly desirable ammonium phosphate $(NH_4H_2PO_4)$ as is found in the product produced by practicing the instant invention.

In U.S. Pat. No. 3,713,802, Gittenait, Jan. 30, 1973, there is taught the production of NP and NPK fertilizers by the reaction of phosphoric acid, urea and ammonia to produce various types of solid fertilizer. Although this invention has some merit, its resulting product does not contain the agronomically desirable nitrate nitrogen, whereas, the products resulting from practicing the teachings of the instant invention do contain this type of nitrogen.

Following the teachings of Jones and Stoller, supra, results in the production of solutions containing an adduct $CO(NH_2)_2 \cdot H_3PO_4$ or $CO(NH_2) \cdot H_2SO_4$ addition compound. Stoller teaches that his solution is a nonammoniated solution, whereas the teachings of the present invention are quite different from that taught by Stoller in that phosphoric acid is caused to be in situ ammoniated. The nitrate portion of the urea ammonium nitrate solution dissociates into ammonium and nitrate ions which, in turn, react with the phosphoric acid to form ammonium phosphate and the nitrate ions react with the urea to form urea nitrate. The reaction proceeds according to the following equation:

$$H_2O + NH_4NO_3 + H_3PO_4 + CO(NH_2)_2 \rightarrow CO(NH_2)_2 \cdot HNO_3 + NH_4H_2PO_4 + H_2O$$

In our invention, even though the phosphoric acid is ammoniated, the pH still remains at low values, i.e., between about 0.8 and about 4.5. The resulting mixtures of urea, urea nitrate, and phosphoric acid that are produced by the practice of the instant invention generally have a much lower salt-out temperature than the urea phosphate solutions produced by following the teachings of Stoller, supra. For example, the salt-out temperature of a 27-9-0 grade produced by the present invention is of the order of $-5°$ F. to about $0°$ F., whereas, the salt-out temperature of a 27-9-0 grade produced by following the dictates of Stoller is about $90°$ F.

In another series of tests on still another embodiment of the present invention, sulfuric acid was incorporated with urea-ammonium nitrate solution and initially formed a poor quality solution, i.e., one which contained a large amount of solids. However, when additional quantities of urea and sulfuric acid were added to the urea-ammonium nitrate solution, a clear solution was produced. Calculations show that the reaction of additional sulfuric acid with the urea-ammonium nitrate solution and urea formed urea nitrate and ammonium bisulfate. It would be expected that the urea nitrate, which has a low solubility, would crystallize out of the solution; however, test results show that the solubility of the urea nitrate and ammonium bisulfate compounds is high in a solution that has a urea N:ammonium nitrate N mole ratio of 3.5. The product resulting from the practice of the instant invention is substantially different from that obtained by following the teachings of Jones U.S. Pat. No. 4,116,664, supra, in that the $H_2SO_4$ added to the urea-ammonium nitrate solution is caused to be ammoniated by the dissociated ammonia from the ammonium nitrate in the urea-ammonium nitrate solution. Therefore, the product resulting in the practice of this embodiment of our invention contains urea nitrogen, nitrate nitrogen, and the secondary element sulfur; it contains the desirable urea nitrate and ammonium bisulfate compounds; its pH varies from about 0.8 to about 4.5; and, of course, it contains the desirable secondary plant nutrient, sulfur. A 25-0-0-4S grade produced by practicing our new invention has a salt-out temperature of $45°$ F., whereas, a product of this grade produced by practicing the teachings of Jones' art has a salt-out temperature of $53°$ F.

SUMMARY OF THE INVENTION

A feature of the present invention which is unique is that through its use, solution type fertilizers can be produced which contains nitrate nitrogen, urea nitrogen, ammonium phosphate, and have low pH's. Extensive agronomic tests have shown that all of these compounds have characteristics that are highly desirable to ensure good plant growth. One of the problems encountered in broadcast application of granular urea or urea-ammonium nitrate solution (about 50 percent of the nitrogen as urea nitrogen and 50 percent of the nitrogen as nitrate nitrogen) is burning of the foliage. Experiments have shown that microorganisms decompose the urea to form ammonia ions which cause this foliar damage. Also, some nitrogen is lost to the atmosphere when this decomposition occurs. Tests with urea nitrate ammonium phosphate solution produced and handled according to the teachings of the instant invention show that it does not cause foliage damage and that there is little or no loss of ammonia when it is surface applied. In addition, it also has less tendency to cause germination damage than some of those fertilizers that contain urea and have a higher pH. Therefore, in using mixtures produced by the instant process, when decomposition of the urea does occur, it reacts with the ammonium phosphate portion of the solution and no nitrogen is lost, the foliage is not damaged, and the seed is not adversely affected.

We have selected the use of urea-ammonium nitrate solution as a source of a portion of the nitrogen of our product for two principal reasons: (a) Most farmers in the United States have determined that they prefer to use urea-ammonium nitrate solution in preference to urea. In 1982, 7.2 million tons of urea-ammonium solution was consumed in the United States, whereas, only 2.2 million tons of urea was used. Probably the reason for the farmers' use of urea-ammonium nitrate solution in preference to urea is that it contains some nitrate nitrogen. (b) Urea-ammonium nitrate fluid fertilizers are used because they are easier to handle than solid urea.

Our invention is principally concerned with the production of nitrate nitrogen solution type fertilizers that are produced by the reaction of phosphoric acid with commercial nitrogen solution which contains 35 percent urea, 45 percent ammonium nitrate, and 20 percent water. The urea is also added to the mixture to provide high analysis NP and NPK solution type fertilizers. A typical fertilizer grade is a 27-9-0 that contains 21 percent ammonium nitrate, 43 percent urea, 14 percent phosphoric acid, and 22 percent water. Another typical grade is a 15-5-5 that contains 25 percent urea, 10 percent ammonium nitrate, 8 percent phosphoric acid, 8 percent potash (62 percent $K_2O$), and 49 percent water. Other grades which were produced were a 12-4-8 (8.2 percent $NH_4NO_3$, 19.6 percent $CO(NH_2)_2$, 6.1 percent $H_3PO_4$, 12.9 percent KCl, and 53.2 percent $H_2O$), 15-15-0 and 10-20-0. A summary of different grades produced with their lowest salt-out temperatures is shown in Table I below:

TABLE I

Grades Produced by Urea Nitrate Ammonium Phosphate Process

| Grade | % $CO(NH_2)_2$ | % $NH_4NO_3$ | % $H_3PO_4$ | % KCl | % $H_2O$ + Impurities | $CO(NH_2)_2$, N : $NH_4NO_3$, N Mole Ratio | Salt-Out Temp. °F. | pH |
|---|---|---|---|---|---|---|---|---|
| 27-9-0 | 44.2 | 20.5 | 12.5 | — | 22.8 | 3.0 | −0 | 2.01 |
| 15-5-5 | 24.5 | 11.4 | 6.9 | 8.1 | 49.1 | 3.0 | 48 | 2.04 |
|  | 25.4 | 10.1 | 6.9 | 8.1 | 49.5 | 3.5 | 44 | 1.99 |
| 12-4-8 | 19.6 | 9.1 | 5.5 | 12.9 | 52.9 | 3.0 | 52 | 2.02 |
|  | 20.3 | 8.1 | 5.5 | 12.9 | 53.2 | 3.5 | 42 | 2.03 |
| 10-20-0 | 16.4 | 7.6 | 27.6 | — | 48.4 | 3.0 | 28 | 1.15 |
| 15-15-0 | 24.6 | 11.2 | 20.7 | — | 43.5 | 3.0 | 45 | 1.83 |
| 10-10-10 | 16.4 | 7.5 | 13.8 | 16.2 | 46.1 | 3.0 | 37 | 1.25 |
| 8-24-0 | 13.1 | 6.1 | 33.1 | — | 47.7 | 3.0 | 30 | 0.92 |
| 4-12-12 | 6.6 | 3.0 | 16.2 | 19.4 | 54.8 | 3.0 | 45 | 1.08 |

The solutions are produced in simple type mixing equipment that includes a batch mix tank mounted on scales and in which the individual materials are weighed. Although there is a reaction of phosphoric acid and ammonium nitrate so that the phosphoric acid is ammoniated by the ammonium nitrate and the reaction is exothermic, this reaction rate is rather slow and there is sufficient cooling by the negative heat of solution of some of the materials used in the mixture (potash and urea) and the sensible heat of the liquid materials used so that no external cooling during production is required.

In our first test, a commercially available urea-ammonium nitrate solution and water were added to the mix tank first and next phosphoric acid was added. The resulting product had a pH between 1.2 and 1.5. Crystals formed therein at room temperature and it was declared a failure. It was determined that the crystals were urea and ammonium phosphate.

In the second test, it was decided that a new TVA suspension would be used instead of the commercially available nitrogen solution. This suspension has a higher urea content than the commercial solution. Its $CO(NH_2)_2$, N:$NH_4NO_3$, N mole ratio is 2.6; whereas, this ratio in the commercial nitrogen solution is 1.05. We had expected to make a suspension; however, to our surprise the resulting fluid was a solution, i.e., no crystals.

The third test was a repeat of the second test. However, instead of the TVA suspension, we decided to use conventional commercial readily available materials; namely, nitrogen solution and urea as well as a commercial wet-process phosphoric acid. This product had the same $CO(NH_2)_2$, N:$NH_4NO_3$, N mole ratio as the second test, which was 2.6. In this test, the urea-ammonium nitrate solution (32-0-0 grade) and water were added to the mix tank first; next, the urea was added, and the phosphoric acid was added last. The resulting product pH was between 1.2 and 2.0 and its salt-out temperature was determined to be 43° F. It was also determined that the solubility of salts in solution was about 336 pounds of solid per hundred pounds of water. The urea, N:ammonium nitrate, N mole ratio was calculated to be about 2.6.

In our fourth test, we used a larger proportion of urea and less urea-ammonium nitrate solution (35 percent urea, 45 percent ammonium nitrate, and 20 percent water); these materials were mixed with merchant-grade phosphoric acid (52 percent $P_2O_5$) that was made from Florida phosphate rock. The resulting $CO(NH_2)_2$, N:$NH_4NO_3$, N mole ratio was 3.0. It was discovered that by increasing the $CO(NH_2)_2$, N:$NH_4NO_3$, N to this level of 3.0, the salting-out temperature decreased to less than 0° F.

Several tests were made in which the $CO(NH_2)_2$, N:$NH_4NO_3$, N mole ratio was varied. These tests prove that the salting out is affected by the $CO(NH_2)_2$, N:$NH_4NO_3$, N ratio in the product. The results of the tests were used to produce a plot of salting-out temperature versus $CO(NH_2)_2$, N:$NH_4NO_3$, N (FIG. 2, discussed infra). The salting-out temperature is usually less than 0° F. for the 27-9-0 grade when the $CO(NH_2)_2$, N:$NH_4NO_3$, N in the product is in the range of 3.0 to 3.5. Similar investigations were made for other grades of material produced.

Potash grades were produced by mixing potash with the 27-9-0. A typical potash type grade is a 15-5-5. This product contained 9.1 percent $NH_4NO_3$, 25.3 percent $CO(NH_2)_2$, 7.6 percent $H_3PO_4$, 8.1 percent KCl, and 49.9 percent $H_2O$. Its salting-out temperature was 44° F. and its pH was about 2. Similar results were obtained when a 12-4-8 grade was produced from the 27-9-0 which has a $CO(NH_2)_2$, N:$NH_4NO_3$, N mole ratio of 3.0.

Other tests were made for the production of a 15-15-0 grade which was used to produce a 10-10-10. Still other tests were made in which an excellent 8-24-0 solution grade was produced. This 8-24-0 was then mixed with potash to produce an excellent solution which had a 10-10-10 grade. All of these tests show that the preferred range of $CO(NH_2)_2$, N:$NH_4NO_3$, N mole ratio is from 2.5 to 3.5.

It was found that generally mixtures produced from acid that is produced from Western U.S. phosphate rock had a higher salting-out temperature than those mixtures which were produced from phosphoric acid that was produced from Florida phosphate rock, and, of course, that the urea, N:ammonium nitrate, N mole ratio in the product affects salting-out temperature of the liquid.

Similar tests were made in which low pH N-S solution type fertilizers were produced by mixing commercial nitrogen solution (35 percent $CO(NH_2)_2$, 45 percent $HN_4NO_3$, and 20 percent $H_2O$) with urea and sulfuric acid. When only the nitrogen solution was mixed with sulfuric acid and water to produce a 25 percent N and 4 percent S grade, a large amount of urea and ammonium sulfate crystals formed in the fluid and it solidified. When urea was substituted for part of the nitrogen solution, less crystallization was observed in the fluid products. When the $CO(NH_2)_2$, N:$NH_4NO_3$, N mole ratio was increased to 11.3, a clear solution resulted which remained free of crystals for several weeks at room temperature. A grade which contained 25 percent N and 4 percent S with a $CO(NH_2)_2$, N:$NH_4NO_3$, N mole ratio of 12.0 had a salt-out temperature of 45° F. This solution was mixed with the 8-24-0 described earlier to produce N-P-S grades. The pH of the product was 1.7. This 25-0-0-4S was also used with phosphoric acid and potash (KCl) to produce mixtures that contain potassium such as an 8-8-8-1.3S. This mixture has a salting-out temperature of −8° F.

Corrosion tests were made with the 27-9-0 grade, the formulation for which is shown in Example I, Table II, infra. These tests show that mild steel had a dubious corrosion rate of 95 mils per year whereas the corrosion rate on stainless steel types 304 and 316L was nil. The 27-9-0 and grades produced from it were not corrosive to PVC type plastics.

OBJECTS OF THE INVENTION

A first principal objective of the instant invention is to produce a solution-type fertilizer that contains both N and P from commercial urea ammonium nitrate solution (35 percent urea, 45 percent ammonium nitrate, and 20 percent water), urea, and commercial wet-process phosphoric acid. In carrying out the procedures for fulfilling this objective, it was shown that a solution-type fertilizer that has a 27-9-0 grade could be produced if the urea, N:ammonium nitrate, N mole ratio was in the range of 3 to 3.5. In this range, salting-out temperature of the liquid is less than 0° F.

It was a second principal objective of the present invention to produce a solution-type fertilizer that contained both urea nitrogen and ammonium nitrate nitrogen. Both of these types of nitrogen are desirable for maximum plant growth. It was discovered that the ammonium nitrate nitrogen content of the solution was directly proportional to the salting-out temperature of the liquid. It was discovered that, if a moderate salting-out temperature such as 40° F. can be tolerated, higher ammonium nitrate contents in the product can be realized. However, when the ammonium nitrate content exceeds 22 percent, salting-out temperature of the liquid exceeds 50° F. which, in almost all instances, is too high to be of practical utility.

Another objective of the present invention was to show that the NP solution can be mixed with potash in a cold mix operation to produce NPK mixtures. With this procedure, it is possible to produce grades such as 15-5-5, 12-4-8, 10-10-10, and 4-12-12.

Still another objective of the instant invention was to demonstrate that a solution which contains urea nitrate and ammonium sulfate solution could be produced by mixing urea ammonium nitrate solution, urea, sulfuric acid. With this procedure it was possible to produce a 25-0-0-4S solution-type fertilizer which had a salt-out temperature of about 40° F., and to demonstrate that such a solution could be mixed with potash and phosphoric acid to produce an NPK mixture that has a low salt-out temperature. This objective was fulfilled when it was demonstrated that one could mix these materials and produce an 8-8-8 grade that had a salt-out temperature of −8° F.

A further objective of the instant invention was to show that low pH fertilizer of the type herein described will not cause germination damage when it is mixed with the seed. It is desirable to mix the fertilizer with the seed so that the number of trips across the field during fertilizer application and planting can be reduced. Conventional methods are to apply the fertilizer and seed on separate paths across the field. Also, there are significant indications that it is beneficial to mix some of the fertilizer with the seed for early crop development. Tests showed that when the 27-9-0 described herein was mixed with wheat seed, germination damage did not occur; whereas, other data show that when a fertilizer with comparable N:P ratio is produced from solid urea and solid diammonium phosphate is mixed with the seed, severe germination damage occurs.

A still further objective of the present invention was to demonstrate that there would be less ammonia loss from the low pH fertilizer solutions that are surface applied than is lost from a comparable mixture of solid urea and diammonium phosphate. The common used mixtures of urea and diammonium phosphate cause severe burning of fescue grass; whereas, a 27-9-0 that was produced using the processes and techniques of the instant invention did not cause burning of such grass. Other researchers have suggested that a principal cause for burning of the foliage is due to the reaction of microorganisms with the urea which results in a release of free ammonia on the leaf surface exposed to the atmosphere. When solutions prepared according to the teachings of the instant invention are applied to foliage, the ammonia is not so released. Also, such solutions contain part of their nitrogen as ammonium nitrate and these microorganisms apparently do not react with this nitrate. These objectives, as well as other objectives and advantages of the instant invention are summarized below:

(1) Produce a low pH liquid that will not cause germination damage or burned foliage.
(2) Produce a solution-type fertilizer that has a salting-out temperature of less than 50° F. and preferably as low as 0° F.
(3) Use commercially available low-cost materials such as urea, nitrogen solution and wet-process phosphoric acid, which acid has a much lower cost than the superphosphoric acid that is usually used to produce solution-type fertilizers.
(4) Produce N:P, N:PK, N:S, and N:P:K:S solution-type fertilizers by cold mixing NP fertilizers and NS fertilizers with potassium chloride (KCl).
(5) Produce a fertilizer that contains a significant portion of its nitrogen as the desirable nitrate nitrogen.
(6) Produce a solution type fertilizer which has good, prolonged storage characteristics.
(7) Produce low pH solution-type fertilizers in non-complicated mixing equipment.
(8) Produce solution-type fertilizers that can be stored in stainless steel or plastic tanks.
(9) Produce low price solution-type fertilizers that can be easily and accurately injected beneath the soil.
(10) Produce solution-type fertilizers that contain all three major nutrients (N:P and K) and minor nutrient (S).

DESCRIPTION OF THE DRAWINGS

Our invention, together with its desired objectives and further advantages thereof, will be better understood from a consideration of the following description taken in connection with the accompanying drawings in which.

Figure 1:
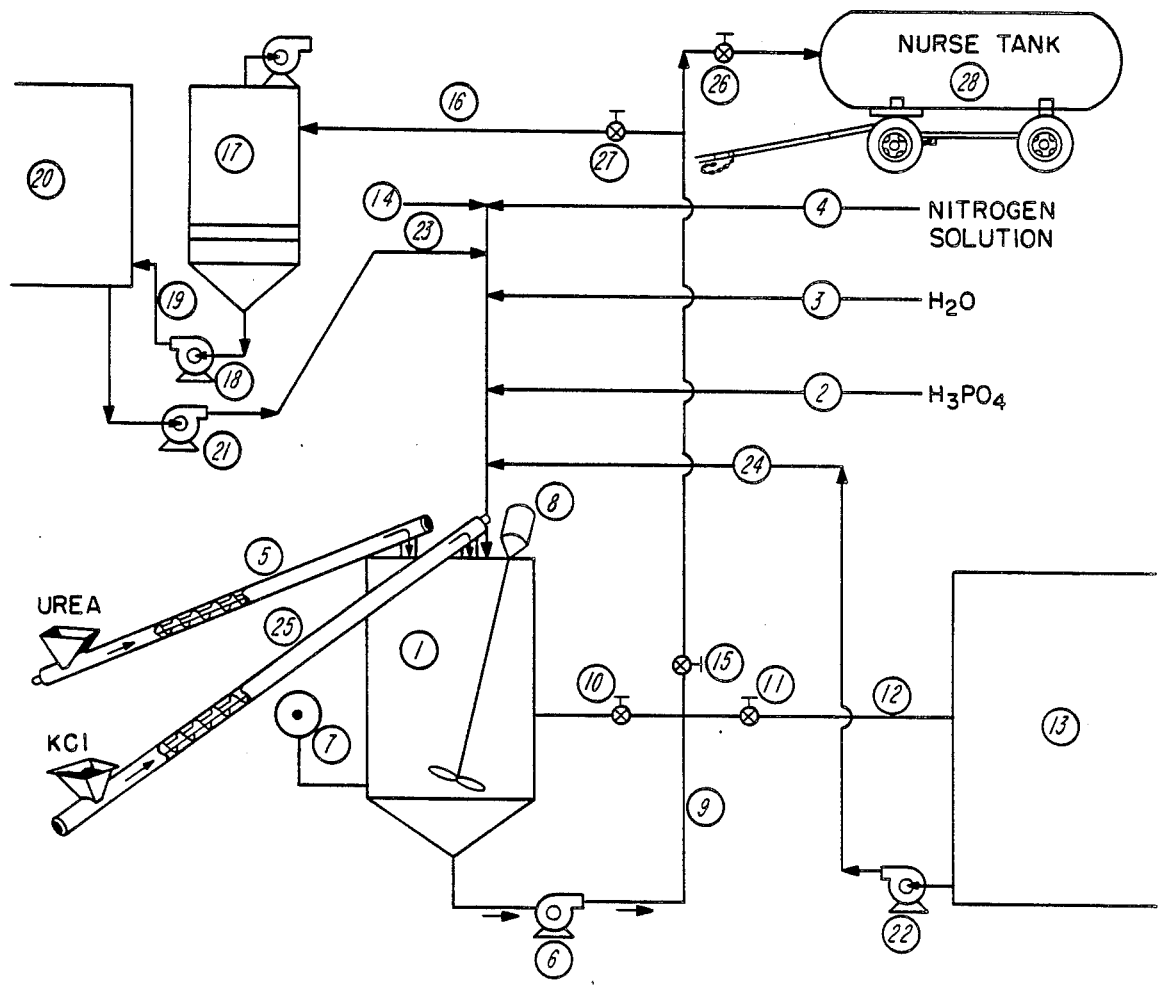
FIG. 1 is a diagrammatical illustration of the mixing and processing equipment utilized in preparing both urea nitrate ammonium phosphate and urea nitrate ammonium sulfate solutions for delivery to the customer's transportation device.

Referring now more particularly to FIG. 1, therein is shown that when urea nitrate ammonium phosphate is produced, stainless steel mix tank 1 is used to mix the phosphoric acid 2, and water 3, nitrogen solution (35 percent $CO\{NH_2\}_2$, 45 percent $NH_4NO_3$, and 20 percent $H_2O$) 4, and urea 5, all from sources not shown. Mix tank 1 is equipped with large recirculating pump 6 and is mounted on scale 7. The correct amount of material for each batch is weighed into tank 1. Mixing is accomplished by the use of agitator 8. Additional mixing is accomplished with recirculating pump 6 through line 9 while valve 10 is open and valves 11 and 15 are closed. When mixing is complete, valve 10 is closed and valve 11 is opened so that finished product can be pumped through line 12 to urea nitrate ammonium phosphate storage 13.

When urea nitrate ammonium sulfate is produced, water 3 and urea 5, both from sources not shown, are pumped to mix tank 1, wherein they are mixed by agitator 8 and pump 6 via line 9 while valve 11 is open and valves 12 and 15 are closed. Subsequently, sulfuric acid is added through line 14 to tank 1 from a source not shown. The resulting mixture in tank 1 becomes hot and after all of the sulfuric acid has been added thereto, valves 10 and 11 are closed and valves 15 and 27 are opened. The hot liquid is pumped through line 16 to stainless steel cooler 17, wherein it is cooled by evaporative cooling. After the temperature is reduced in cooler 17, the product is pumped by pump 18 through line 19 to urea nitrate ammonium sulfate storage 20. When grades that contain potassium are produced, the heretofore produced products, for example, urea nitrate ammonium phosphate and urea nitrate ammonium sulfate are pumped from storage 20 and 13 via transfer pumps 22 and 21 through lines 23 and 24, all respectively, to mix tank 1. Next, water 3, from a source not shown, is added to mix tank 1. Recirculation of fluid in mix tank 1 is started by starting pump 6, opening valve 10, and ensuring that valves 11 and 15 are closed. Next, potash (60–62 percent $K_2O$ as KCl), from a source not shown, is added by conveyor 25. The correct amount of all materials is weighed in tank 1 by scale means 7. Mixing is continued until all of the potash has been dissolved. When this has been accomplished, the finished product is pumped to customer's tank 28 via pump 6 and line 9. Valves 15 and 26 are opened while valves 10, 11, and 27 are closed.

Figure 2:
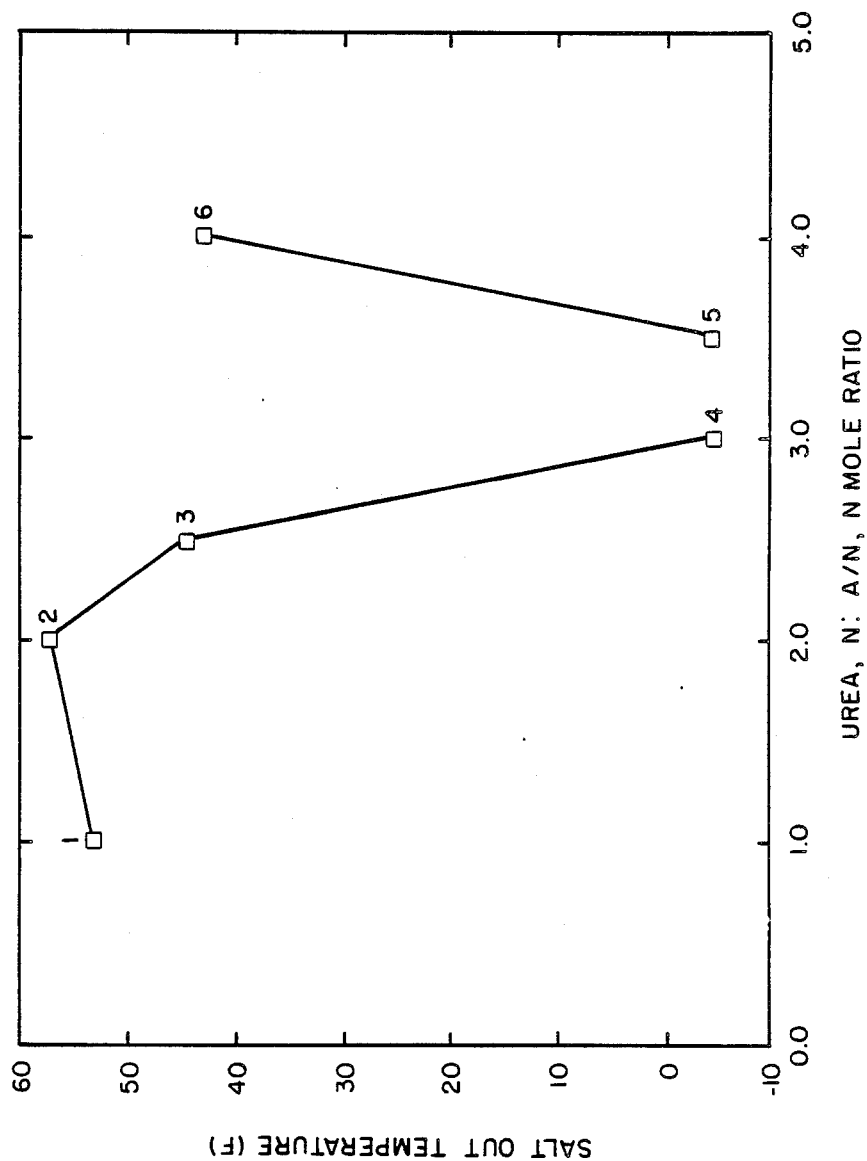
FIG. 2 is a graphical illustration of the highly critical relationship between the urea, N:ammonium nitrate, N mole ratios, and the salt-out temperatures of the solutions so produced.

Referring now more specifically to FIG. 2, therein is depicted a graphical illustration of salting-out temperature vs. $CO(NH_2)_2$, N:$NH_4NO_3$, N mole ratio. Point 1 thereon represents the salting-out temperature obtained when no urea was used in the formulation. The salt-out temperature was about 57° F., which is too high for most farm areas. This temperature increases to about 58° F. (point 2) when enough urea is added to increase the $CO(NH_2)_2$, N:$NH_4NO_3$, N mole ratio to 2.0. It decreases to about 44° F., as shown by point 3, when enough urea is added to increase the urea, N:$NH_4NO_3$, N mole ratio to 2.5. When this ratio is increased to 3.5 by the addition of larger quantities of urea, the salting-out temperature decreases to less than 0° F., as shown at point 4 of the curve. This salt-out temperature increases as the $CO(NH_2)_2$, N:$NH_4NO_3$, N mole ratio is increased above 3.5 (point 5) and when this ratio is 4.0 (point 6) the salt-out temperature is 45° F.

The solutions for compositions relating to point 1 through point 6 were cooled to below the salt-out temperatures and the crystals were identified. The results of these examinations are as follows:

| Point No. on curve | $CO(NH_2)_2$, N $NH_4NO_3$, N Mole Ratio | Crystal Fraction Identification at 0° F. |
|---|---|---|
| | Crystalline Phases at Various $CO(NH_2)_2$, N:$NH_4NO_3$, N Mole Ratios for 27-9-0 Grade | |
| 1 | 1.05 | 50–60 Percent $CO(NH_2)_2 \cdot HNO_3$ 40–60 percent $NH_4H_2PO_4$ |
| 2 | 2.5 | Essentially all $NH_4H_2PO_4$ |
| 3 | 3.0 | Essentially all $NH_4H_2PO_4$ |
| 4 | 3.5 | No crystals formed at 0° F. |
| 5 | 4.0 | Essentially all $CO(NH_2)_2$ |

These data show that the solutions which have $CO(NH_2)N:NH_4NO_3$, N mole ratios between 3.0 and 3.5 will have salt-out temperatures equal to or less than 0° F. The data also show that it is essential that none of the crystalline phase be $CO(NH_2)_2 \cdot HNO_3$ in order that the salt-out temperature should be less than 40° F., which represents the average spring temperature of many agricultural regions when fertilizer is applied. It is, of course, preferable that the salt-out be near or less than 0° F. so that the solutions can be stored through winter.

EXAMPLES

In order that those skilled in the art may better understand how the present invention can be practiced, the following examples are given by way of illustration and not necessarily by way of limitation.

The following are examples of the various tests conducted in which nitrogen solution (35 percent $CO\{NH_2\}_2$, 45 percent $NH_4NO_3$, and 20 percent $H_2O$) is reacted with urea and either with phosphoric acid or sulfuric acid to produce various N-P, NPK, NS, and NPKS solution-type fertilizer.

EXAMPLE I

This is an example in which a 27-9-0 grade is produced by the procedure and in equipment as illustrated in the description of FIG. 1, supra, and the product contains 13.5 percent of its nitrogen as the desirable nitrate nitrogen. No cooling of the mixture was required because the maximum temperature during mixing was only 80° F. The formulation used is shown in Table II below.

TABLE II

| Formulation and Operating Data for 27-9-0 Grade [$CO(NH_2)_2$, N:$NH_4NO_3$, N = 2.6] | |
|---|---|
| Formulation, Lbs Per Ton | |
| Commercial nitrogen solution (32-0-0 grade) | 927 |
| Commercial urea (46-0-0 grade) | 533 |
| Wet-process phosphoric acid (from Florida rock 0-54-0 grade) | 333 |
| Water | 207 |
| pH | 2.0 |
| Maximum mix temperature, °F. | 80 |
| $CO(NH_2)_2N:NH_4NO_3$, N mole ratio | 2.6 |
| Salt-out temperature, °F. | 43 |
| Salts in solution, lb salt per 100 lb $H_2O$ | 336 |

TABLE II-continued

Formulation and Operating Data for 27-9-0 Grade
[$CO(NH_2)_2$, $N:NH_4NO_3$, N = 2.6]

| Formulation, Lbs Per Ton | |
|---|---|
| $NO_3$N, % of total N | 13.5 |

EXAMPLE II

In this Example, as well as in the remaining examples, to wit, III to VII, the procedures and equipment utilized in Example I, supra, was utilized.

In this Example, larger quantities of urea were used to increase the $CO(NH_2)_2 N:NH_4NO_3$, N mole ratio to 3.0. When this was done, the salt-out temperature of the solution decreased to below 0° F., as shown in Table III below.

TABLE III

Formulation and Operating Data for
Production of 27-9-0 Grade
[$CO(NH_2)_2$, $N:NH_4NO_3$, N = 3.0]

| Formulation Lbs Per Ton of Product | |
|---|---|
| Commercial nitrogen solution (32-0-0 grade) | 840 |
| Commercial urea (46-0-0 grade) | 589 |
| Phosphoric acid, wet-process (Florida rock 0-54-0 grade) | 334 |
| Water | 237 |
| pH | 2.01 |
| Salt-out temperature, °F. | 0 |
| Specific gravity | 1.325 |
| Maximum mix temperature, °F. | 80 |
| $CO(NH_2)_2$, $N:NH_4NO_3$, N mole ratio | 3.0 |
| $NO_3$, N % of total N | 12.3 |
| Salts in solution, lbs salt per 100 lb water | 318 |

The product had a specific gravity of 1.325. No cooling of the fluid was required because the maximum temperature during mixing was 80° F. The pH was low and there were no crystals in the solution at 0° F.

EXAMPLE III

This example is set forth to illustrate that when the $CO(NH_2$, $N:NH_4NO_3$, N in the solution was 3.5, the salting-out temperature of the mixture remained at 0, or less, as shown in Table IV below.

TABLE IV

Formulation and Operating Data for 27-9-0 Grade
[$CO(NH_4)_2$, $N:NH_4NO_3$, N = 3.5]

| Formulation, Lbs Per Ton | |
|---|---|
| Commercial nitrogen solution (32-0-0) | 760 |
| Commercial urea (46-0-0) | 645 |
| Phosphoric acid (0-54-0) | 334 |
| Water | 261 |
| pH | 2.0 |
| $CO(NH_2)_2$, $N:NH_4NO_3$, N mole ratio | 3.5 |
| Salt-out temperature | <0 |
| $NO_3$ N | 11.1 |
| Salts in solution, lbs salt per 100 lb $H_2O$ | 317 |

EXAMPLE IV

This example relates to a solution mixture that was made from urea-ammonium nitrate solution, urea, and sulfuric acid. This mixture contains 25 percent N and 4 percent S.

The formulation and operating results are shown in Table V below:

TABLE V

Formulation and Operating Data for 25-0-0-4S Grade
[$CO(NH_2)_2$, $N:NH_4NO_3$, N = 11.3]

| Formulation, Lbs Per Ton of Product | |
|---|---|
| Nitrogen solution (32-0-0 grade) | 257.3 |
| Urea (46-0-0 grade) | 908 |
| Sulfuric acid (96% $H_2SO_4$) | 250 |
| Water | 584.7 |
| Maximum mix temperature, °F. | 200 |
| pH | 1.7 |
| $NO_3$ N, % of total N | 4.2 |
| $CO(NH_2)_2$, $N:NH_4NO_3$, N mole ratio | 11.3 |
| Salting-out temperature, °F. | 45 |
| Lbs salt in solution per 100 lb water | 209 |

The mixture became very hot during mixing and some cooling of the product was required. Although the salt-out temperature is higher than the 27-9-0 of Example II, supra, it is sufficiently low for the product to be used in many agricultural regions. It should be very attractive for use in soils that are difficult in the secondary nutrients.

EXAMPLE V

In most farming areas potash is required for good crop growth. Therefore, this example is given to show how convenient it is to mix an N:P mixture such as 27-9-0 solution produced according to the procedures outlined in Example II, supra, with potash to produce a good quality solution that contains the primary nutrient potassium. The solution has a grade of 15-5-5. The formulation and operating results are shown in Table VI below.

TABLE VI

Formulation and Operating Results for
Production of 15-5-5 Grade

| Formulation, Lbs per Ton Product | |
|---|---|
| 27-9-0 solution (from Example III) | 1111 |
| Potash (0-0-62 grade) | 161 |
| Water | 728 |
| pH | 1.99 |
| Specific gravity | 1.39 |
| Minimum temperature during mixing, °F. | 50 |
| Salt-out temperature, °F. | 44 |
| Salts in solution, lb salts per 100 lb $H_2O$ | 101 |
| $CO(NH_2)_2$, $N:NH_4NO_3$, N | 3.5 |

The fluid cooled during mixing; however, it cooled to only 50° F. Therefore, this cooling was not detrimental to dissolution of the potash in the fluid. The product did not evolve either chlorine gas or $NO_x$ fumes. Its salting-out temperature is low enough for use in planting season and in most areas that require potassium addition to the soil.

EXAMPLE VI

In some regions of the country, a lower nitrogen to $P_2O_5$ ratio, such as is found in 10-27-0, 15-15-0, and 8-24-0 grades is desirable. This example illustrates how products of these types can be produced by following the teachings of the instant invention. The formulation and operating data for a 10-20-0 grade is shown in Table VII below.

TABLE VII

Formulation and Operating Data for Production of 10-20-0, 15-15-0 and 8-24-0 Grades

| Formulation, Lbs per Ton Product | Grades | | |
|---|---|---|---|
| | 15-15-0 | 10-20-0 | 8-24-0 |
| Nitrogen solution (32-0-0 grade) | 458 | 306 | 256 |
| Urea (46-0-0 grade) | 332 | 220 | 170 |
| Phosphoric acid (0-54-0) | 556 | 740 | 889 |
| Water | 654 | 734 | 685 |
| Salt-out temperature, °F. | 45 | 28 | 30 |
| Salts in solution, lbs salt per 100 lbs H$_2$O | 118 | 122 | 122 |
| pH | 1.83 | 1.15 | 0.92 |
| CO(NH$_2$)$_2$, N:NH$_4$NO$_3$, N mole ratio | 3.0 | 3.0 | 3.0 |

All of these products mix well with potash (potassium chloride) to produce excellent N:P:K mixtures by simply adding solid potash and water to the fluid. The 15-15-0 was mixed with potash and water to produce a 10-10-10 mixture with a salt-out temperature of 37° F. The 8-24-0 was mixed with potash and water to produce a 4-12-12 which has a salt-out temperature of 45° F.

EXAMPLE VII

Some soils in this country require all three major nutrients, N, P, and K, and the minor nutrient, sulfur. The tests in this example were conducted such tht a N:P:K:S grade was produced from phosphoric acid (0-54-0), 25-0-0-4S [CO(NH$_2$)$_2$, N:NH$_4$NO$_3$, N=3.5], potash and water. The grade produced was an 8-8-8-1.3S. The formula and operating data are shown in Table VIII below.

TABLE VIII

Formulation and Operating Data for Production of 8-8-8-1.3S

| Formulation, Lbs per Ton of Product | |
|---|---|
| 25-0-0-4S | 640.0 |
| 0-54-0 | 296.3 |
| Potash (0-0-62 grade) | 258 |
| Water | 805.6 |
| CO(NH$_2$)$_2$, N:NH$_4$NO$_3$ N | 11.3 |
| Pounds salt per 100 lb H$_2$O | 86.6 |
| pH | 1.14 |
| Salt-out temp., °F. | −8 |

The salting-out temperature of this solution was very low, −8° F. It is postulated that a higher analysis grade such as a 10-10-10 could be produced with a satisfactory salt-out temperature.

INVENTION PARAMETERS

The desired operating parameters for the two operating modes of the instant process are tabulated below. In mode 1 nitrogen solution, urea, and phosphoric acid are used. The resulting solution contains urea nitrate and ammonium phosphate. In mode 2 nitrogen solution, urea, and sulfuric acid are reacted and the solution contains urea nitrate and ammonium sulfate.

| Variable | Mode 1 Urea Nitrate Phosphate | Mode 2 Urea Nitrate Sulfate |
|---|---|---|
| N | 8-27 | 20-25 |
| P$_2$O$_5$ | 20-28 | — |
| K$_2$O | 8-12 | 8-12 |
| CO(NH$_2$), N:NH$_4$NO$_3$,N | 2.5-3.5 | 10-15 |
| pH | 0.5-2.5 | 0.5-2.5 |
| Salt-out temp., °F. | −5-≈45 | <45 |
| P$_2$O$_5$:S | — | 4-7 |
| Specific gravity | 1.2-1.4 | 1.2-1.4 |
| Solubility, lbs salt per 100 lb H$_2$O | 100-350 | 100-350 |
| NO$_3$, N, % total N | 10-15 | 4-5 |
| Ammonium nitrate content, % wt | 15-22 | |

The preferred operating range for mode 1 is one in which the salting-out temperature is below 50° F. and the urea nitrate content of the product is as high as possible. Test results show that these two variables are inversely proportional to each other. Therefore, the values shown set the boundaries for the production of a satisfactory N:P urea nitrate phosphate solution.

Larger quantities of urea are required to produce a urea nitrate sulfate solution. Although the nitrate content is low (4.2 percent total N is NO$_3$, N) this amount of nitrate is not only desirable agronomically, it also helps to lower salting-out temperature to a satisfactory level. Without the inclusion of nitrogen solution in the formulation, the salt-out temperature of the 25-0-0-4S is 53° F. and when the product contains about 13 percent by weight nitrogen solution this salting-out temperature is 45° F.

While we have shown and described particular embodiments of our invention, modifications and variations thereof will occur to those skilled in the art. We wish it to be understood therefore that the appended claims are intended to cover such modifications and variations which are within the true scope and spirit of our invention,

What we claim as new and desire to secure by Letters Patent of the United States is:

1. A process for preparing high-analysis in situ partially ammoniated liquid nitrogen fertilizer solutions consisting essentially of introducing into fertilizer solution reacting means a stream of predetermined quantities of urea, a stream of predetermined quantities of phosphoric acid, and a stream of predetermined quantities of commercial nitrogen solution, said phosphoric acid selected from the group consisting of furnace-grade phosphoric acid having a P$_2$O$_5$ content thereof ranging from about 54 percent to about 76 percent, wet-process phosphoric acid having a P$_2$O$_5$ content thereof ranging from about 50 to about 55 percent by weight of P$_2$O$_5$, and mixtures thereof; said commercial nitrogen solution containing about 35 percent by weight urea, about 45 percent by weight ammonium nitrate, and about 20 percent by weight water and having a urea-N:ammonium nitrate-N mole ratio of about 1.05, said predetermined quantities of said streams of urea, phosphoric acid, and commercial nitrogen solutions being sufficient and properly proportioned to produce in said liquid fertilizer solution reacting means a fertilizer solution therein of grade ranging from about 27-9-0 to about 8-24-0, a pH ranging from between about 0.8 and about 4.5, and a urea-N:ammonium nitrate-N mole ratio ranging from about 2.5 to about 3.5, said resulting high-analysis in situ partially ammoniated liquid fertilizer nitrogen solution characterized by the fact that the salt-out temperature thereof ranges from about 45° F. to about −5° F. in direct and inversely proportional relationship to said urea-N:ammonium nitrate-N mole ratio.

2. The process of claim 1 for producing a liquid fertilizer solution having a grade of 27-9-0 wherein the pounds of nitrogen per ton of product produced, the pounds of P$_2$O$_5$ per ton of product produced, and the pounds of nitrogen per ton of product produced supplied by said urea, said phosphoric acid, and said commercial nitrogen solution, respectively, ranges from about 240 to about 300 pounds nitrogen, from about 176 to about 184 pounds P$_2$O$_5$, and ranges from about 240 to about 300 pounds nitrogen, respectively.

3. The process of claim 1 for producing a liquid fertilizer solution having a grade of 15-15-0 wherein the pounds of nitrogen per ton of product produced, the pounds of P$_2$O$_5$ per ton of product produced and the pounds of nitrogen per ton of product produced supplied by said urea, said phosphoric acid, and said commercial nitrogen solution, respectively, ranges from about 125 to about 170 pounds nitrogen, ranges from about 290 to about 310 pounds P$_2$O$_5$, and ranges from about 130 to about 175 pounds nitrogen, respectively.

4. The process of claim 1 for producing a liquid fertilizer solution having a grade of 8-24-0 wherein the pounds of nitrogen per ton of product produced, the pounds of P$_2$O$_5$ per ton of product produced, and the pounds of nitrogen per ton of product produced supplied by said urea, said phosphoric acid, and said commercial nitrogen solution, respectively, ranges from about 65 to about 90 pounds nitrogen, ranges from about 470 to about 490 pounds P$_2$O$_5$, and ranges from about 70 to about 95 pounds nitrogen, respectively.

5. The process of claim 1 for producing a liquid fertilizer solution having a grade of 10-20-0 wherein the pounds of nitrogen per ton of product produced, the pounds of P$_2$O$_5$ per ton of product produced, and the pounds of nitrogen per ton of product produced supplied by said urea, said phosphoric acid, and said commercial nitrogen solution, respectively, ranges from about 85 to about 115 pounds nitrogen, ranges from about 392 to about 408 pounds P$_2$O$_5$, and ranges from about 85 to about 115 pounds nitrogen, respectively.

6. The process of claim 1 wherein in addition to said streams of urea, phosphoric acid, and commercial nitrogen solution added to said liquid solution reacting means a stream of potassium source is added thereto in predetermined and proportioned quantities to yield a fertilizer solution of grade ranging from about 4-4-6 to about 12-18-12.

7. A high-analysis in situ partially ammoniated liquid fertilizer solution which is the reaction product of urea, phosphoric acid, and commercial nitrogen solution, said solution having a grade ranging from about 27-9-0 to about 8-24-0 and said solution characterized by the fact that said solution has a urea nitrogen:ammonium nitrate, N mole ratio ranging from about 2.5 to about 3.5 and a salting-out temperature ranging from about 45° F. to about −5° F., said salting-out temperature being in direct and inversely proportional relationship to said urea nitrogen:ammonium nitrate, N mole ratio.

8. A process for preparing high-analysis in situ partially ammoniated liquid nitrogen sulfur fertilizer solution consisting essentially of introducing in the fertilizer solution reacting means a stream of predetermined quantities of urea, a stream of predetermined quantities of sulfuric acid, and a stream of predetermined quantities of commercial nitrogen solution, said commercial nitrogen solution containing about 35 percent by weight urea, about 45 percent by weight ammonium nitrate, and about 20 percent by weight water and having urea N:ammonium nitrate, N mole ratio of about 1.05, said predetermined quantities of said streams of urea, sulfuric acid, and commercial nitrogen solution being sufficiently and properly proportioned to produce in said liquid solution reaction means a fertilizer solution having a grade of about 25-0-0-4S, having a pH ranging from about 0.8 and about 4.5, having a urea nitrogen N:ammonium nitrate nitrogen ranging from about 9 to about 13, and having a N:S weight ratio ranging from about 4 and about 8, said resulting high-analysis in situ partially ammoniated liquid fertilizer nitrogen sulfur solution characterized by the fact that the salt-out temperature thereof is less than about 40° F.

9. The process of claim 8 wherein in addition to said streams of urea, sulfuric acid, and commercial nitrogen solution added to said liquid solution reacting means a stream of potassium source is added thereto in predetermined and proportional quantities to yield a fertilizer solution of grade ranging from about 8-8-8-1S to about 4-4-16-1S.

* * * * *